United States Patent Office 3,830,925
Patented Aug. 20, 1974

3,830,925
NEMATOCIDAL AND FUNGICIDAL AGENTS
Paul Rathgeb, Basel, Switzerland, assignor to
Ciba-Geigy Corporation, Ardsley, N.Y.
No Drawing. Filed Nov. 24, 1971, Ser. No. 201,955
Claims priority, application Switzerland, Dec. 15, 1970,
18,553/70; Aug. 12, 1971, 11,942/71; Oct. 22, 1971,
15,408/71
Int. Cl. A01n 9/22, 9/12
U.S. Cl. 424—270   2 Claims

ABSTRACT OF THE DISCLOSURE

New methods for combating plant parasitic nematodes and fungi employ compounds of the formula

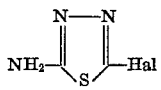

wherein Hal is chlorine or bromine or a salt thereof with organic or inorganic acids.

---

The present invention relates to new methods for combating plant parasitic nematodes and fungi.

The nematocidal or fungicidal active substances employed are 2-halogeno-5-amino-1,3,4-thiadiazoles of the formula

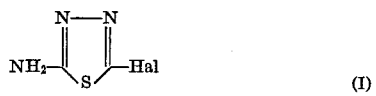

and salts thereof with inorganic or organic acids. Hal in the above formula represents chlorine or bromine.

The 2-halogeno-5-amino-1,3,4-thiadiazoles of the formula I are known compounds, cf. J. prakt. Chem. 122, 289 (1929) and U.S. Pat. 2,457,078.

This compound can be manufactured by bromination of amino-1,3,4-thiadiazole or halogenation of 2-mercapto-5-amino-1,3,4-thiadiazole to give 2-chloro-sulphonyl-5-acetylaminoacetylamino - 1,3,4 - thiadiazole and subsequently boiling this product with hydrochloric acid.

It is also possible to obtain the chloro-amino compound by substitution of the bromine atom in 2-bromo-5-amino-1,3,4-thiadiazole with hydrochloric acid. In this process the thiadiazoles occur in the form of their hydrohalides, from which it is possible to obtain the free bases by addition of alkali, in particular ammonia. However, the hydrohalides can also be processed direct to yield the agents according to the invention.

Addition salts of other inorganic or organic acids can also be obtained by reacting the free bases in known manner with the corresponding acids. Suitable acids are, for example: phosphoric acid, sulphuric acid, perchloric acid, alkylsulphuric acids, such as methyl- or ethylsulphuric acid, naphthoic acids, benzoic acid, halobenzoic acids, acetic acid, haloacetic acids, such as trichloroacetic acid, aminoacetic acid, propionic acid, halopropionic acid, butyric acid, lactic acid, stearic acid, aliphatic dicarboxylic acids, such as oxalic acid, tartaric acid, maleic acid, etc.

The active substances of the formula I are excellently suitable for combating plant parasitic nematodes or their development stages. Among these are, for example, representatives of the following genera:

Meloidogyne spp.
Heterodera spp.
Ditylenchus spp.
Pratylenchus spp.
Helicotylenchus spp.
Tylenchorhynchus spp.
Rotylenchus spp.
Rotylenchulus spp.
Tylenchulus spp.
Belonolaimus spp.
Trichodorus spp.
Radopholus spp.
Longidorus spp.
Xiphinema spp.

The active substances of the formula I also possess excellent fungicidal properties against phytopathogenic fungi in cultivated plants of the most diverse kinds, such as cereals, maize, rice, vegetables, ornamental plants, fruit varieties, grapevines, farm products, etc.

Using the active substances of the invention it is possible to check or destroy fungus infections which have occurred on fruit, blossoms, leaves, stems, tubers and roots, and parts of plants which then grow later also remain free from such infections. In this connection it is to be mentioned that the active substances are absorbed by the roots of the plants, that is to say that active substances of the formula I possess a systematic activity. The active substances of the formula I are active against the phytopathogenic fungi belonging to the following classes, orders and species of fungi:

Oomycetes such as Plasmodiophora types, Aphanomyces types, Pythium types, Phytophthora types, e.g. (Phytophthora infestans, Phytophthora cactorum), Plasmopara types, e.g. (Plasmopara viticola), Bremia types (Bremia lactucae), Peronospora types, e.g. (Peronospora tabacina), Pseudoperonospora types, e.g. (Pseudoperonospora humuli).

Zygomycetes such as Rhizopus types.

Ascomycetes such as Eurotiales, such as Aspergillus types, Penicillium types, e.g. (Penicillium digitatum, Penicillium italicum), Taphrinales, such as Taphrina types, e.g. (Taphrina deformans), Erysiphales, such as Erysiphes types, e.g. (Erysiphes cichoracearum, Erysiphes graminis), Podosphaera leucotricha, Sphaerotheca types (Sphaerotheca pannosa), Uncinula types (Unicinula necator), Helotiales, such as Monilina types (Monilinia [Sclerotinia] fructicola, Monilinia laxa), Diplocarpon types (Diplocarpon rosae), Pseudopeziza types, Sphaeriales, such as Nectria types (Nectria galligena), Ceratocystis types, Pseudosphaeriales, such as Venturia types (Venturia inaequalisα, Mycosphaerella types, Ophiobolus types (Ophiobolus graminis), Cochliobolus types (Helminthosporium miyabeanus), Cercospora types, (Cercospora beticola, Cercospora musae).

Basidiomycetes, such as Aphyllophorales, Pellicularia types, e.g. (Pellicularia filamentora=(Rhizoctonia solani)), Uredinales, such as Puccinia types, e.g. (Puccinia triticina), Uromyces types (Uromyces phaseoli), Hemileia types, (Hemileia vastatrix), Cronartium types (Cronartium ribicola), Phragmidium types Phragmidium subcorticium), Gymnosporingium types.

Denteromycetes=(Fungi imperfecti) such as Piricularia types, e.g. (Piricularia oryzae), Corynespora types. Thielaviopsis types, Clasterosporium types, Botrytis types (Botrytis cinerea), Cladosporium types, Alternaria types, (Alternaria solani), Verticillium types (Verticillium albo-atrum), Phialophora types, Melanconiales, such as Colletotrichum types, Fusarium types such as (Fusarium oxysporum, Fusarium nivale), Gloesporium types (Gloeosporium fructigenum), Sphaeropsidales, e.g. Septoria types (Septoria apicola), Diplodia types, (Diplodia natalensis), Mycelia sterilia, e.g. Sclerotium types (Sclerotium rolfsii).

The active substances according to the invention can also be used for treating seed grain, fruit, tubers etc. and for protecting them from fungus infections, for example from smut fungi of all kinds, such as:

Ustilaginales, such as Ustilago types (*Ustilago avenae*)
Tilletia types (*Tilletia tritici*),
Urocystis and Tuburcinia types
Phoma types (*Phoma betae*).

The compounds of the formula I are also active against plant parasitic bacteria such, for example, as *Pseudomonas tomato* and *Pseudomonas lachrymans*. They also possess an insecticidal activity and are active, for example, against the larvae of the Colorado beetle and aphids.

To broaden their activity spectrum the active substances of the formula I may contain in admixture bactericides, fungistatic agents, bacteriostatic agents, nematocides, and/or, for example, the following fungicides:

dodecylguanidine acetate (Dodine)
pentachloronitrobenzene (Quintozene)
pentachlorophenol (PCP)
2-(1-methyl-n-propyl)-4,6-dinitrophenyl-2-methyl-crotonate (Binapacryl)
2-(1-methyl-n-heptyl)-4,6-dinitrophenylcrotonate (Dinocap)
2,6-dichlor-4-nitroaniline (Dichloran)
2,3,5,6-tetrachloro-benzoquinone (1,4) (Chloranil)
2,3-dichloro-naphthoquinone (1,4) (Dichlone)
N-(trichlormethylthio) phthalimide (Folpat)
N-(trichloromethylthio)cyclohex-4-en-1,2-dicarboximide (Captan)
N-(1,1,2,2-tetrachloroethylthio)cyclohex-4-en-1,2-dicarboximide (Captafol)
N-methansulfonal-N-trichlormethylthio-chloroaniline
N'-dichlorofluoromethylthio-N,N-dimethyl-N'-phenyl-sulfamide (Dichlofluanid)
O-ethyl-S-benzyl-phenyldithiophosphate
O,O-diethyl-S-benzyl-thiolphosphate
disodium-ethylene-1,2-bis-dithiocarbamate (Nabam)
zinc-ethylene-1,2-bis-dithiocarbamate (Zineb)
manganese-ethylene-1,2-bis-dithiocarbamate (polymeric) (Maneb)
tetramethylthiuramdisulfide (Thiram)
1-oxy-3-acetyl-6-methyl-cyclohexene-(5)dione-(2,4) (dehydroacetic acid)
8-hydroxyquinoline (8-quinolinol)
2-dimethylamino-6-methyl-5-n-butyl-4-hydroxy-pyrimidine methyl-N-benzimidazol-2-yl-N-(butylcarbamoyl)carbamate (Benomyl)
2-ethylamino-6-methyl-5n-butyl-4-hydroxypyrimidine
2,3-dicyano-1,4-dithia-anthraquinone (Dithianon)
2-(4-thiazolyl)-benzimidazole
3,5-dimethyltetrahydro-1,3,5-thiadiazine-2-thione (Dazomet)
2,3-dihydro-5-carboxanilido-6-methyl-1,4-oxathine
pentachlorobenzyl alcohol.

The compounds of the formula I can be used as pure concentrate or together with suitable carriers and/or additives. Suitable carriers and additives can be solid or liquid and correspond to the substances conventionally used in formulation technique such, for example, as solvents, dispersants, wetting agents, adhesives, thickeners, binders and/or fertilisers.

For application the compounds of the formula I can be processed to dusts, emulsion concentrates, granules, dispersions, sprays, solutions or suspensions in conventional formulation as commonly employed in application technique.

The agents according to the invention are manufactured in known manner by intimately mixing and/or grinding active substances of the formula I with the suitable carriers, optionally with the addition of dispersants or solvents which are inert towards the active substances.

The active substances may be available and can be used in the following forms:

Solid forms: Dusts, tracking agents, granules, coated granules, impregnated granules and homogeneous granules.
Liquid forms:
(a) active substances which are dispersible in water: wettable powders, pastes, emulsions;
(b) solutions.

To manufacture solid forms (dusts, tracking agents), the active substances are mixed with solid carriers. Suitable carriers are, for example: kaolin, talcum, bolus, loess, chalk, limestone, ground limestone, attaclay, dolomite, diatomaceous earth, precipitated silica, alkaline earth silicates, sodium and potassium aluminium silicates (feldspar and mica), calcium and magnesium sulphates, magnesium oxide, ground synthetic materials, fertilisers, for example ammonium sulphate, ammonium phosphate, ammonium nitrate, urea, ground vegetable products, such as corn meal, bark dust, sawdust, nutshell meal, cellulose powder, residues of plant extractions, activated charcoal etc. These substances can either be used alone or in admixture with one another.

Polymer granules can be very easily manufactured by dissolving an active substance of the formula I in an organic solvent and applying the resulting solution to a granulated material, for example attapulgite, $SiO_2$, granicalcium, bentonite etc. and then evaporating the solvent.

Polymer granules can also be manufactured by mixing the active substances of the formula I with polymerisable compounds (urea/formaldehyde; dicyandiamide/formaldehyde; melamine/formaldehyde or others), whereupon a mild polymerisation is carried out that does not affect the active substances and in the process of which the granulation is carried out during the gel formation. It is more advantageous to impregnate finished, porous polymer granules (urea/formaldehyde, polyacrylonitrile, polyesters or others) which have a specific surface area and a favourable predeterminable adsorption/desorption ratio, with the active substances, for example in the form of their solutions (in a low boiling solvent) and to remove the solvent. Polymer granules of this kind in the form of microgranules having a bulk density of 300 g./litre to 600 g./litre can also be manufactured with the aid of atomisers. The dusting can be carried out from aircraft over extensive areas of cultures of useful plants.

It is also possible to obtain granules by compacting the carrier with the active substance and carriers and subsequently comminuting the product.

To these mixtures can also be added additives which stabilize the active substance and/or non-ionic, anionic and cationic surface active substances, which for example improve the adhesion of the active ingredients on plants or parts of plants (adhesives and agglutinants) and/or ensure a better wettability (wetting agents) and dispersibility (dispersing agents). Examples of suitable adhesives are the following: olein/chalk mixture, cellulose derivatives (methyl cellulose, carboxylmethyl cellulose), hydroxyethyl glycol ethers of monoalkyl and dialkyl phenols having 5 to 15 ethylene oxide radicals per molecule and 8 to 9 carbon atoms in the alkyl radical, lignin sulfonic acids, their alkali metal and alkaline earth metal salts, polyethylene glycol ethers (carbowaxes), fatty alcohol polyethylene glycol ethers having 5 to 20 ethylene oxide radicals per molecule and 8 to 18 carbon atoms in the fatty alcohol moiety, condensation products of ethylene oxide/propylene oxide, polyvinyl pyrrolidones, polyvinyl alcohols, condensation products of urea and formaldehyde, and also latex products.

The water-dispersible concentrates of the active substance, i.e. wettable powders, pastes and emulsifiable concentrates, are agents which can be diluted with water to any concentration desired. They consist of active substance, carrier, optionally additives which stabilize the active substance, surface-active substances and anti-foam agents and, optionally, solvents. The concentration of active substance in these agents is 5 to 80%.

Wettable powders and pastes are obtained by mixing and grinding the active substances with dispersing agents and pulverulent carriers in suitable apparatus until homogeneity is attained. Carriers are, for example, those mentioned for the solid forms of application. In some cases it is advantageous to use mixtures of different carriers. As dispersing agents there can be used, for example, condensation products of sulfonated naphthalene and sulfonated naphthalene derivatives with formaldehyde, condensation products of naphthalene or naphthalene sulfonic acids with phenol and formaldehyde, as well as alkali, ammonium and alkaline earth metal salts of lignin sulfonic acid, in addition, alkylaryl sulfonates, alkali and alkaline earth metal salts of dibutyl naphthalene sulfonic acid, fatty alcohol sulfates such as salts of sulfated hexadecanols, heptadecanols, octadecanols, and salts of sulfated fatty alcohol glycol ethers, the sodium salt of oleoyl ethionate, the sodium salt of oleoyl methyl tauride, ditertiary acetylene glycols, dialkyl dilauryl ammonium chloride and fatty acid alkali and alkaline earth metal salts.

Suitable anti-foam agents are silicones.

The active substances are so mixed, ground, sieved and strained with the additives mentioned above that, in wettable powders, the solid particle size of from 0.02 to 0.04 and in pastes, of 0.03 is not exceeded. To produce emulsifiable concentrates and pastes, dispersing agents such as those given in the previous paragraphs, organic solvents and water are used. Examples of suitable solvents are the following: alcohols, benzene, xylenes, toluene, dimethyl sulfoxide, and mineral oil fractions boiling between 120 and 350° C. The solvents must be practically odorless, not phytotoxic, inert to the active substances and not readily inflammable.

Furthermore, the agents according to the invention can be applied in the form of solutions. For this purpose the active substance or several active substances of general Formula I are dissolved in suitable organic solvents, mixtures of solvents or in water. Aliphatic and aromatic hydrocarbons, chlorinated derivatives thereof, alkyl naphthalenes, and mineral oils alone or mixed with each other, can be used as organic solvents. The solution should contain the active substances in a concentration of from 1 to 20%.

The content of active substance in the above described agents is between 0.1% to 95%, in which connection it should be mentioned that in the case of application from aircraft or some other suitable means of application, it is possible to use concentrations of up to 99.5% or even pure active substance.

For combating plant parasitic nematodes the thiadiazoles of the formula I are applied in the form of solid or liquid agents. For application to the soil those agents are particularly advantageous which ensure a uniform distribution of the active substances over a layer of soil 15 to 25 cm. deep. Both the method and the form of application depend particularly on the climate and the soil conditions. Since the active substances of the invention are not phytotoxic and have no detrimental effect on the germinating power, they can thus also be applied without observing a so-called waiting time immediately before or after the plants have been seeded. Already existing plant cultures can be treated likewise with the agents according to the invention.

The following substances are used to manufacture 10% granules:

(a)

10 parts of 2-chloro-5-amino-1,3,4-thiadiazole,
4 parts of polyethylene glycol
2 parts of light silicic acid
84 parts of limestone grit The active substance is finely ground and mixed with the limestone grit. Polyethylene glycol is then added and finally the light silicic acid.

These granules, in a concentration of 3 g. of active substance per m.$^2$, were worked 10 cm. deep into soft, sandy soil (open test field) immediately before sowing. This soil was infected in natural way with *Meloidogyne incognita*. *Hybiscus esculentus* (Okra-Clemson Spineless) was then sown in the so prepared oil. The experiment was evaluated after 70 days by counting the galls present on the roots.

Rating of the nematocidal action:
    0=very good action (no galls)
    5=no action (galls as on control)
    1–4=intermediate stages The experiment showed that 2-chloro-5-amino-1,3,4-thiadiazole has a very good nematocidal action (plants practically without galls); the rating was 0.6.

(b)

10 parts of 2-chloro-5-amino-1,3,4-thiadiazole
10 parts of paraffin, melting point: 50–52° C.
2 parts of polyethylene glycol
1 part of light silicic acid
77 parts of limestone grit (0.4–0.8 mm.)

The active substance is finely ground, mixed with limestone grit and the polyethylene glycol then added. A solution of paraffin in petroleum ether is sprayed on to this mixture, which is left to dry. Finally, the light silicic acid is added.

Immediately before the planting, the granules obtained in this way—in a concentration of 5 g. of active substance per m.$^2$—were worked to a depth of 10 cm. into medium heavy sandy soil which was artificially infected with *Meloidogyne arenaria*. Tomato cuttings were planted into the thus prepared soil and the galls presents on the roots were counted after 40 days. See experiment (a) for the rating of the nematocidal action.

In this experiment too the plants had practically no galls; the rating of the 2-chloro-5-amino-1,3,4-thiadiazole was 0.3.

Dusts

The following substances are used to manufacture (a) a 5% and (b) a 2% dust:

(a)

5 parts of 2-chloro-5-amino-1,3,4-thiadiazole,
95 parts of talcum;

(b)

2 parts of 2-bromo-5-amino-1,3,4-thiadiazole,
1 part of highly disperse silicic acid,
97 parts of talcum.

The active substances are mixed with the carriers and ground.

Tracking agents

The following substances are used to manufacture a 20% tracking agent:

20 parts of 2-bromo-5-amino-1,3,4-thiadiazole,
1 part of paraffin oil,
79 parts of talcum.

The active substances are mixed with the carriers and ground.

Wettable powders

The following constituents are used to manufacture 25% wettable powders:

(a)

25 parts of 2-bromo-5-amino-1,3,4-thiadiazole,
5 parts of lignin sulphonic acid calcium salt,
3 parts of sodium dibutyl naphthyl sulphonate, 2 parts of Champagne chalk/hydroxyethyl cellulose (1:1),
20 parts of Champagne chalk,
45 parts of kaolin;

(b)

25 parts of 2-chloro-5-amino-1,3,4-thiadiazole,
5 parts of naphthalene sulphonic acid/phenolsulphonic acid/formaldehyde condensate (3:2:1),
2 parts of sodium dibutyl naphthyl sulphonate,
2 parts of Champagne chalk/hydroxyethyl cellulose (1:1),
66 parts of kaolin.

The active substances are intimately mixed in suitable mixers with the additives and ground in corresponding mills and rollers. Wettable powders are obtained which can be diluted wth water to yield suspensions of any desired concentration.

EXAMPLE 1

(a) 101 grams of amino-1,3,4-thiadiazole are suspended in 200 ml. of glacial acetic acid and 177 g. of bromine are added dropwise to the suspension. The reaction is exothermic and should not exceed 40° C. The mixture is stirred for 1 to 2 days at 25° C. and then concentrated in vacuo. The residue is taken up in about 400 ml. of ice water and rendered alkaline with 25% ammonia. The crystalline product is filtered off and recrystallised from ethanol, to yield 140 g. of 2-bromo-5-amino-1,3,4-thiadiazole which decomposes at 192–194° C.

(b) 90 grams of 2-bromo-5-amino-1,3,4-thiadiazole are dissolved in 2000 ml. of 20% hydrochloric acid and the solution is boiled under reflux for 12 hours. The clear colourless solution is then concentrated in vacuo, the residue taken up in ice water and rendered alkaline with concentrated ammonia. The precipitated product is filtered off and recrystallised from ethanol, to yield 48 g. of 2-chloro-5-amino-1,3,4-thiadiazole (decomposition point: 191–192° C).

EXAMPLE 2

160 grams of 2-mercapto-5-amino-1,3,4-thiadiazole (known from J. Chem. Soc. 1958, 1509) are suspended in 950 ml. of glacial acetic acid and 195 g. of acetic anhydride are added to the suspension. The mixture is heated under reflux for 30–45 minutes. Upon cooling, the reaction mixture is diluted with 1 vol. of ice water and chlorine is passed in at 15° C. The reaction is completed after about 3 hours. The product is filtered off and the still moist filter cake is introduced into 1000 ml. of 20% hydrochloric acid. The mixture is heated for 1 hour under reflux. Upon cooling, the clear solution is concentrated to ⅓ of its volume and the concentrate is rendered alkaline with concentrated ammonia with the addition of ice. The resulting product is filtered off and recrystallised from ethanol, to yield about 100 g. of 2-chloro-5-amino-1,3,4-thiadiazole which decomposes at 192° C.

EXAMPLE 3

Nematocidal action

To test the action against soil nematodes the active substance in the respective concentration is worked into and intimately mixed with sand or soil which is infected with root gall nematodes (*Meloidogyne arenaria*). Tomato cuttings are planted immediately thereafter in the thus prepared soil in test series A, and in test series P tomatoes are sown after a waiting period of 6 days.

To evaluate the nematocidal action the galls present on the roots are counted 28 days after the planting and sowing respectively.

Rating of the nematocidal action:
0=very good
1=good
2=satisfactory
3=moderate
4=poor
5=none (attack as on controls)

| Active substance [1] | Concentration in, p.p.m. | Nematocidal action of— | | | |
|---|---|---|---|---|---|
| | | A | | P | |
| | | Sand | Soil | Sand | Soil |
| 2-bromo-5-amino-1,3,4-thiadiazole | 50-10 | 0-0 | 0.3-2 | 0-0 | 0-1 |
| Tetrahydro-3,5-dimethyl-2H-1,3,5-thiadiazine-2-thione | 50-10 | 2-5 | 5-5 | 0-4 | 2-5 |

[1] Known from Chem. Week No. 12.4.69, p. 56.

EXAMPLE 4

Systematic fungicidal action

Carrots are washed, dipped in 70% alcohol (ethanol) and externally disinfected by singeing them. They are then cut in 1 cm. cylindrical segments. Each segment is placed in a sterile Petri dish (diam.=5 cm.) previously filled to a depth of 1 mm. with an aqueous suspension of the active substance formulated as 25% wettable powder.

The upper side of the carrot segment is infected with a piece of fur of the fungus *Alternaria solani*. The dishes are incubated in a thermostat at 20–22° C. and evaluated after 3 and 6 days by evaluating the growth of fur on the carrot segments. Segments which were infected without addition of active substance were used as basis of comparison.

Rating:
0=no growth of fur—complete inhibition by the active substance
1=faint development of fur—strong inhibition by the active substance
2=distinct growth of fur, but inhibited in comparison to the controls
3=normal development of fur, no inhibition at all by the active substance

| Active substance | Concentration in, p.p.m. | Activity against *Alternaria solani* |
|---|---|---|
| 2-bromo-5-amino-1,3,4-thiadiazole | 1,000 | 1 |
| Untreated controls | | 3 |

I claim:
1. A method for combatting plant parasitic nematodes comprising applying to soil in which plants are growing or are to be grown a nematocidally effective amount of a compound of the formula

in which Hal is bromine, or a salt of said compound with hydrochloric or hydrobromic acid.

2. The method of Claim 1 in which the compound is 2-bromo-5-amino-1,3,4-thiadiazole.

References Cited

UNITED STATES PATENTS

| 3,691,183 | 9/1972 | Thaler | 424—270 |
| 3,700,684 | 10/1972 | Remers et al. | 424—270 |
| 3,720,684 | 3/1973 | Krenzer et al. | |

OTHER REFERENCES

Zinsser's Textbook of Bacteriology, 9th Ed., Appleton-Century-Crafts, Inc., N.Y. (1948), pp. 7, and 135–138.

STANLEY J. FRIEDMAN, Primary Examiner